P. B. Watson. Harness Hame.

118310. PATENTED AUG 22 1871

Witnesses:
E. Wolff
Wm. H. C. Smith

Inventor:
P. B. Watson
Per
Attorneys.

UNITED STATES PATENT OFFICE.

PETER B. WATSON, OF BELVIDERE, NEW JERSEY, ASSIGNOR TO HIMSELF AND MOSES A. DEWITT, OF SAME PLACE.

IMPROVEMENT IN HAMES FOR HARNESS.

Specification forming part of Letters Patent No. 118,310, dated August 22, 1871.

*To all whom it may concern:*

Be it known that I, PETER B. WATSON, of Belvidere, in the county of Warren and State of New Jersey, have invented a new and useful Improvement in Harness-Hames; and I do hereby declare that the following is a full, clear, and exact description thereof, which will enable others skilled in the art to make and use the same, reference being had to the accompanying drawing forming part of this specification, in which—

Figure 1:
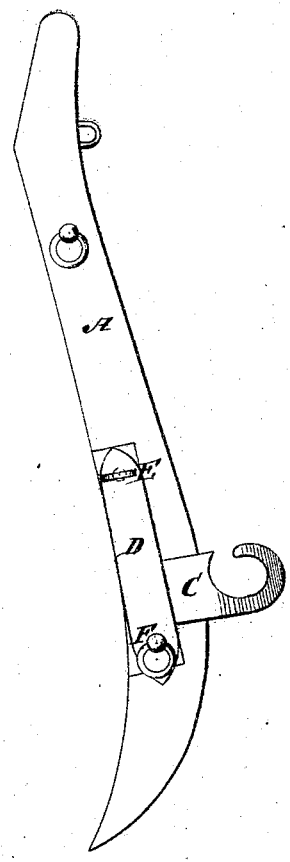
Figure 2:
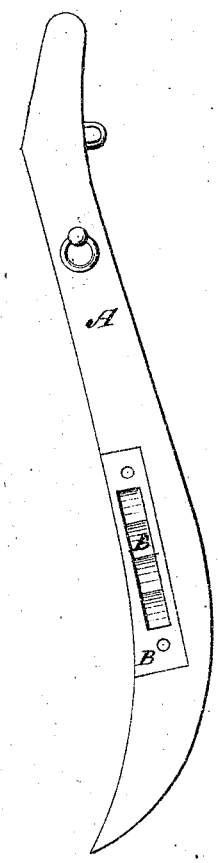
Figure 3:
Figure 4:
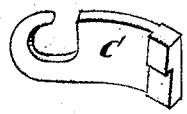

Figure 1 is a side view of my improved hame. Fig. 2 is a side view of the same, the cap-plate and hook being removed. Fig. 3 is an under-side perspective view of the cap-piece. Fig. 4 is an under-side perspective view of the hook.

Similar letters of reference indicate corresponding parts.

My invention has for its object to furnish improved harness-hames, which shall be so constructed that the hame-tug hook may be adjusted to shift the draft-pressure upon the horse's shoulders as may be required, and which shall at the same time be simple in construction and easily adjusted; and it consists in the construction and combination of the various parts, as hereinafter more fully described.

A is the hame, the lower part of which is recessed to receive a grooved and toothed plate, B. C is the hame-tug hook, upon the under side of the base of which is formed a toothed projection to fit into the toothed groove of the plate B, so that the said hook may be easily moved up and down to adjust it, and, when adjusted, may be held securely in place. D is the cap-plate, which is recessed upon the rear part of its under side to receive and fit upon the forward end of the hame-tug hook C. The grooved and toothed plate B and the recessed cap-plate D are secured to each other and to the hame A, clamping the hame-tug hook C between them by the thumb-screw or bolt E at their upper ends, and by the bolt F of the breast-strap ring at their lower ends. The bolts E F pass through the plates D B and screw into the hame A, or into nuts inserted in said hame, so as to secure the detachable parts firmly in place.

By this construction the point of draft upon the horse's shoulders may be easily and conveniently adjusted, as may be desired.

Having thus described my invention, I claim as new and desire to secure by Letters Patent—

The grooved and toothed plate B, the toothed adjustable hook C, and the recessed cap-plate D, in combination with each other and with the recessed hame A, substantially as herein shown and described, and for the purpose set forth.

PETER B. WATSON.

Witnesses:
GEO. W. TUNIS,
S. T. DICKINSON.